United States Patent [19]

Marchionni et al.

[11] Patent Number: 4,668,357

[45] Date of Patent: May 26, 1987

[54] METHOD OF PREPARING PERFLUOROPOLYETHERS HAVING REGULATED MOLECULAR WEIGHT FROM THE PRODUCT OBTAINED BY PHOTOCHEMICAL OXIDATION

[75] Inventors: Giuseppe Marchionni, Milan; Gian T. Viola, Ravenna, both of Italy

[73] Assignee: Montedison S.p.A., Milan, Italy

[21] Appl. No.: 831,616

[22] Filed: Feb. 21, 1986

[30] Foreign Application Priority Data

Feb. 22, 1985 [IT] Italy .............................. 19626 A/85

[51] Int. Cl.$^4$ ..................... B01J 19/12; C07C 43/12; C07C 179/087
[52] U.S. Cl. ..................... 204/157.92; 204/157.94; 525/539; 528/392; 528/401; 568/560; 568/615
[58] Field of Search ................ 204/157.94, 157.92; 568/560, 615; 525/539; 528/392, 401

[56] References Cited

U.S. PATENT DOCUMENTS

| | | | |
|---|---|---|---|
| 3,214,478 | 10/1965 | Milian | 204/157.94 |
| 3,715,378 | 2/1973 | Sianesi et al. | 204/157.92 |
| 3,847,978 | 11/1974 | Sianesi et al. | 568/560 |
| 3,931,132 | 1/1976 | Low | 528/398 |
| 4,238,602 | 12/1980 | Griffin | 528/401 |
| 4,523,039 | 6/1985 | Lagow et al. | 568/615 |

*Primary Examiner*—Howard Williams
*Attorney, Agent, or Firm*—Stevens, Davis, Miller & Mosher

[57] ABSTRACT

A method of preparing perfluoropolyethers having a regulated molecular weight starting from the product obtained by photochemical oxidation of $C_2F_4$ and having a various content of oxygen peroxide, consisting in heat-treating the peroxidized product in order to partially remove the oxygen peroxide till reducing it to a relatively low value, which is prefixed as a function of the molecular weight to be obtained for the final product, and in the subsequent treatment with gaseous fluorine at high temperatures.

4 Claims, No Drawings

METHOD OF PREPARING PERFLUOROPOLYETHERS HAVING REGULATED MOLECULAR WEIGHT FROM THE PRODUCT OBTAINED BY PHOTOCHEMICAL OXIDATION

BACKGROUND OF THE INVENTION

As is known, from the reaction between oxygen and tetrafluoroethylene conducted at low temperature, in the presence of U.V. radiations and in an inert solvent, generally a perfluorocarbon or a fluorochlorocarbon, a perfluoropolyether is obtained, which exhibits a peroxidic oxygen content varying as a function of the operative conditions under which the photo-oxidation has been conducted. Such content, expressed as % by weight, corresponds to a gram-atom of oxygen for each peroxy-group. Generally, the oxygen peroxide content ranges from 0.7 to 2.8% by weight. The conversion of such product to perfluoropolyether free from peroxidic oxygen if carried out merely by heat treatment, leads to a final product whose molecular weight is too high for most of the applications known so far.

As it is known, peroxidic oxygen can be removed from the peroxidized precursors also by reduction with proper reducing agents: in such case the perfluoropolyether chain breaks in positions corresponding to peroxy-bond —O—O—. In such manner it is possible to obtain products exhibiting also a rather low molecular weight. However, instead of the oxygen peroxide it is possible to introduce also functional groups deriving from the reducing substance employed; furthermore it often happens that the molecular weight cannot be well adjusted.

DESCRIPTION OF THE INVENTION

Thus, it is an object of the present invention to provide a very simple and safe method, characterized by a perfect reproduceability of the results, for obtaining a perfluoropolyether having a prefixed molecular weight and perfluorinated neutral end groups, starting from a product obtained by the photochemical oxidation of $C_2F_4$ and exhibiting a various content of oxygen peroxide.

The method consists in reducing the oxygen peroxide content by thermal treatment till reaching a relatively low content of residual oxygen peroxide: such residual value is predetermined as a function of the molecular weight to be obtained for the final product.

The resulting product is then subjected to a treatment with gaseous fluorine at a temperature ranging from 100° to 250° C., preferably from 160° to 220° C. Thus, a final product exhibiting the desired molecular weight as well as the perfluorinated neutral end groups is obtained.

The proposed method is based on the experimental ascertainment that, in presence of fluorine, under the reaction conditions, the peroxy-bond breaks, thus giving rise to two chain sections having, as an end group, a carbon radical which immediately reacts with the fluorine, thus forming neutral perfluoroalkyl end groups. The process is easy to be controlled, the molecular weight reduction depends on the residual oxygen peroxide, which, on the other hand, can be very easily controlled during the first step of the process, namely during the heat-treatment of the photo-oxidation product, which has a relatively high peroxidic oxygen content. In conclusion, from the separation of the peroxy bond in the presence of fluorine two neutral fluorinated end groups form. When the average molecular weight of the starting peroxidized product is known, it will be easy to calculate, on the basis of the oxygen peroxide content, which reduction of the average molecular weight can be obtained by means of the treatment with fluorine.

The treatment with fluorine in the process according to the present invention can be also carried out in the presence of U.V. radiation, operating, in such case, at lower temperatures ranging from 50° to 120° C., preferably at temperatures around 100° C.

The following examples are given to illustrate the present invention, without being however a limitation thereof.

EXAMPLE 1

By photo-oxidation of $C_2F_4$ at $-40°$ C. and subsequent thermal treatment at 200° C., according to the method described in British Pat. No. 1,226,566, there were prepared 675 g of perfluoropolyether from tetrafluoroethylene with a viscosity of 1251 cSt and an average molecular weight of 18,200, having a peroxidic oxygen content equal to 0.168% by weight. This product was charged into a glass reactor equipped with cooler, bubbler, stirrer, $CO_2$ trap, and with a temperature control system, and it was subjected to fluorination at a temperature of 220° C. with a fluorine flow of 10 l/h during a total time of 10 h.

There were obtained 565 g of neutral perfluoropolyether with a viscosity of 105 cSt and an average molecular weight of 7,000, and in the $CO_2$ trap 78 g of low-boiling products were collected.

EXAMPLE 2

According to the method described in the abovecited GB patent No. 1,226,566, there were prepared 805 g of perfluoropolyether from tetrafluoroethylene having a viscosity of 2211 cSt and an average molecular weight of 22,500, the peroxidic oxygen content being equal to 0.06% by weight. This product was charged into a reactor like the one described in example 1 and was subjected to fluorination at a temperature of 220° C. during 10 hours and at a temperature of 140° C. during 1 hour, with a fluorine flow of 10 l/h.

At the end of the test there were obtained 733 g of neutral perfluoropolyether having a viscosity of 441 cSt and an average molecular weight of 12,300, as well as 34 g of low-boiling products in the $CO_2$ trap.

EXAMPLE 3

730 g of perfluoropolyether from tetrafluoroethylene having a viscosity of 2211 cSt and an average molecular weight equal to 22,500, and a peroxidic oxygen content of 0,11% by weight, prepared according to the method of GB patent No. 1,226,566, were introduced into a reactor similar to the one described in example 1 and were subjected to fluorination at a temperature of 220° C. during 7 hours and at a temperature of 240° C. during 2 hours, with a fluorine flow of 10 l/h.

At the end of the test, 618 g of neutral perfluoropolyether with a viscosity of 224 cSt and an average molecular weight of 9.600, as well as 63 g of low-boiling products in the $CO_2$ trap were obtained.

EXAMPLE 4

1,000 g of perfluoropolyether from tetrafluoroethylene with a viscosity of 1548 cSt and an average molecular weight of 19,900, having a peroxidic oxygen content equal to 0,15% by weight, prepared according to the method cited hereinbefore, were introduced into a reactor similar to the one described in Example 1 and were subjected to fluorination at a temperature of 220° C. during 11 hours with a fluorine flow of 10 l/h.

At the end of the test, 800 g of neutral perfluoropolyether having a viscosity of 171 cSt and an average molecular weight of 8,600, as well as 116 g of low-boiling products in the $CO_2$ trap were discharged.

EXAMPLE 5

939 g of perfluoropolyether from tetrafluoroethylene with a viscosity of 3750 cSt and an average molecular weight of 27,500, having a peroxidic oxygen content equal to 0.395% by weight, prepared according to the method cited hereinbefore, were introduced into a glass reactor equipped with cooler, bubbler, stirrer, dipping tube for samplings, $CO_2$ trap, and with a temperature control system, and they were subjected to fluorination at a temperature of 180° C. during 11 hours with a fluorine flow of 10 l/h. After a 4-hour reaction there was withdrawn a portion of perfluoropolyether having a viscosity of 1236 cSt, an average molecular weight of 17,900 and a peroxidic oxygen residual content of 0.349% by weight; after 7 hours a second portion of perfluoropolyether exhibited a viscosity of 650 cSt, an average molecular weight of 14,300 and a residual content of peroxidic-oxygen of 0.31% by weight.

EXAMPLE 6

According to the method described in the above-cited British patent, there were prepared 866 g of perfluoropolyether from tetrafluoroethylene with a viscosity of 3750 cSt, an average molecular weight of 27,500 and a peroxidic oxygen content equal to 0.395% by weight. The product was charged into a glass reactor, similar to the one described in example 5 and it was subjected to fluorination at a temperature of 200° C. with a fluorine flow of 7 l/h. After a 4-hour reaction, a portion of perfluoropolyether exhibited a viscosity of 166 cSt and an average molecular weight of 8,600, with a residual content of peroxidic oxygen equal to 0.114% by weight.

EXAMPLE 7

300 g of perfluoropolyether from tetrafluoroethylene with a viscosity of 1250 cSt and a molecular weight of 18,200 and having an peroxidic-oxygen content equal to 0.168% by weight, were introduced into a cylindrical Pyrex reactor equipped with a coaxial quartz sheath system suited to contain a medium pressure mercury vapour lamp, a bubbling cooler, a $CO_2$ trap and a suitable temperature regulating system. After switching on the lamp, fluorine was introduced into the reactor, while maintaining the reagents at a temperature of 70° C. After a 14-hour irradiation there were obtained 265 g of a neutral perfluoropolyether with a viscosity of 130 cSt, while 15 g of low-boiling products were collected in the $CO_2$ trap.

What is claimed is:

1. A process for preparing perfluoropolyether having a regulated molecular weight and neutral perfluorinated end groups, starting from the product obtained by photochemical oxidation of $C_2F_4$ with different peroxidic oxygen contents, consisting in heat-treating the peroxidized product in order to partially remove the peroxidic oxygen till reducing it to a prefixed value as a function of the molecular weight to be obtained for the final product, and in the subsequent treatment with gaseous fluorine at a temperature ranging from 100° to 250° C. or at a temperature from 50to 120° C., when operating in the presence of U.V. radiations.

2. The process according to claim 1, in which the treatment with gaseous fluorine is accomplished at a temperature ranging from 160° C. to 220° C.

3. The process according to claim 1, in which the treatment with gaseous fluorine is accomplished at a temperature around 100° C. in the presence of U.V. radiations.

4. Perfluoropolyethers with regulated molecular weight, having neutral perfluorinated end groups, obtained according to the process claimed in claim 1.

* * * * *